United States Patent
Kim et al.

(10) Patent No.: US 8,780,771 B2
(45) Date of Patent: Jul. 15, 2014

(54) CYCLIC DELAY DIVERSITY AND PRECODING FOR WIRELESS COMMUNICATION

(75) Inventors: Byoung-Hoon Kim, San Diego, CA (US); Durga Prasad Malladi, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 12/026,360

(22) Filed: Feb. 5, 2008

(65) Prior Publication Data

US 2008/0247364 A1    Oct. 9, 2008

Related U.S. Application Data

(60) Provisional application No. 60/888,494, filed on Feb. 6, 2007.

(51) Int. Cl.
| H04B 7/00 | (2006.01) |
| H04B 7/208 | (2006.01) |
| H04B 7/02 | (2006.01) |
| H04L 27/00 | (2006.01) |
| H04L 1/00 | (2006.01) |

(52) U.S. Cl.
USPC ........... 370/310; 370/344; 375/267; 375/299; 375/346

(58) Field of Classification Search
USPC ....................................................... 370/310
See application file for complete search history.

(56) References Cited

U.S. PATENT DOCUMENTS

| 6,377,632 B1 | 4/2002 | Paulraj et al. |
| 6,842,487 B1 * | 1/2005 | Larsson ................. 375/260 |
| 7,385,617 B2 | 6/2008 | Tahat |
| 7,609,613 B2 * | 10/2009 | Aghvami et al. ............ 370/208 |

(Continued)

FOREIGN PATENT DOCUMENTS

| EP | 1919115 | 5/2008 |
| JP | 2008118650 A | 5/2008 |

(Continued)

OTHER PUBLICATIONS

Qualcomm Europe: R1-070434: Precoding Details for DL MIMO, 3GPP TSG-RAN WG1 #47bis, Sorrento Italy, Jan. 15-19, 2007.

(Continued)

*Primary Examiner* — Guang Li
(74) *Attorney, Agent, or Firm* — Peng Zhu

(57) ABSTRACT

Techniques for sending a MIMO transmission using a combination of cyclic delay diversity and precoding are described. A set of delays (e.g., zero delay, small delay, and large delay) for cyclic delay diversity and a set of precoding matrices may be supported. In one design, a Node B may select a delay specifically for a UE or for a set of UEs served by the Node B. In another design, a UE may evaluate different combinations of precoding matrix and delay, determine the combination with the best performance, and send this combination of precoding matrix and delay to the Node B. The Node B may perform precoding with the precoding matrix and then processing for cyclic delay diversity based on the selected delay. Alternatively, the Node B may perform processing for cyclic delay diversity based on the selected delay and then precoding with the precoding matrix.

27 Claims, 10 Drawing Sheets

(56) References Cited

U.S. PATENT DOCUMENTS

| | | | |
|---|---|---|---|
| 7,839,944 B2* | 11/2010 | Lee et al. | 375/267 |
| 7,848,438 B2 | 12/2010 | Baum et al. | |
| 7,894,548 B2 | 2/2011 | Walton et al. | |
| 8,068,552 B2 | 11/2011 | Wang et al. | |
| 8,126,077 B2* | 2/2012 | Sandhu | 375/267 |
| 8,160,177 B2* | 4/2012 | Zhang et al. | 375/299 |
| 2003/0174648 A1* | 9/2003 | Wang et al. | 370/235 |
| 2005/0201270 A1 | 9/2005 | Song et al. | |
| 2006/0068698 A1* | 3/2006 | Sandhu et al. | 455/1 |
| 2006/0077886 A1 | 4/2006 | Oh et al. | |
| 2006/0078063 A1 | 4/2006 | Hottinen | |
| 2006/0193245 A1* | 8/2006 | Aghvami et al. | 370/208 |
| 2007/0008946 A1* | 1/2007 | Kim | 370/345 |
| 2007/0041457 A1* | 2/2007 | Kadous et al. | 375/260 |
| 2007/0098097 A1* | 5/2007 | Khan et al. | 375/260 |
| 2007/0140377 A1* | 6/2007 | Murakami et al. | 375/299 |
| 2007/0147543 A1* | 6/2007 | Horng et al. | 375/299 |
| 2007/0274411 A1* | 11/2007 | Lee et al. | 375/267 |
| 2008/0039030 A1* | 2/2008 | Khan et al. | 455/101 |
| 2008/0080637 A1* | 4/2008 | Khan et al. | 375/267 |
| 2008/0089442 A1* | 4/2008 | Lee et al. | 375/299 |
| 2008/0132282 A1* | 6/2008 | Liu et al. | 455/562.1 |
| 2008/0183311 A1* | 7/2008 | MacArthur et al. | 700/29 |
| 2009/0067531 A1* | 3/2009 | Lee et al. | 375/267 |
| 2009/0197546 A1 | 8/2009 | Kim et al. | |
| 2009/0219858 A1 | 9/2009 | Liang et al. | |
| 2009/0225646 A1 | 9/2009 | Dayal et al. | |
| 2009/0307558 A1* | 12/2009 | Lee et al. | 714/749 |
| 2010/0075693 A1 | 3/2010 | Kishigami et al. | |
| 2010/0322349 A1 | 12/2010 | Lee, II et al. | |
| 2011/0116566 A1 | 5/2011 | Takahashi et al. | |
| 2011/0129027 A1 | 6/2011 | Takaoka et al. | |

FOREIGN PATENT DOCUMENTS

| | | |
|---|---|---|
| JP | 2009538556 A | 11/2009 |
| JP | 2010502110 A | 1/2010 |
| RU | 2208297 C2 | 7/2003 |
| WO | WO0101626 A1 | 1/2001 |
| WO | 0225857 | 3/2002 |
| WO | 2005117321 | 12/2005 |
| WO | 2006021227 | 3/2006 |
| WO | WO2006021228 A1 | 3/2006 |
| WO | 2006121381 | 11/2006 |

OTHER PUBLICATIONS

International Search Report—PCT/US08/053232, International Search Authority—European Patent Office, Sep. 3, 2008.

Written Opinion—PCT/US08/053232, International Search Authority—European Patent Office, Sep. 3, 2008.

Taiwan Search Report—TW097104887—TIPO—Oct. 16, 2011.

LG Electronics, et al., "CDD-based Precoding for E-Utra downlink MIMO", 3GPP TSG RAN WG1 Meeting#47, Nov. 2006, pp. 1-6, R1-063345.

LG Electronics, et al., "Generalized CDD scheme for E-UTRA down link MIMO", 3GPP TSG RAB WG Meeting#46, Sep. 2006, pp. 1-8, R1-062314.

NTT DoCoMo, "CDD-Based Pre-coding Scheme for Rank=1 and 2", 3GPP TSG RAN WG1 Meeting #46bis, Oct. 2006, pp. 1-7, R1-062732.

Taiwan Search Report—TW097104887—TIPO—Oct. 5, 2012.

* cited by examiner

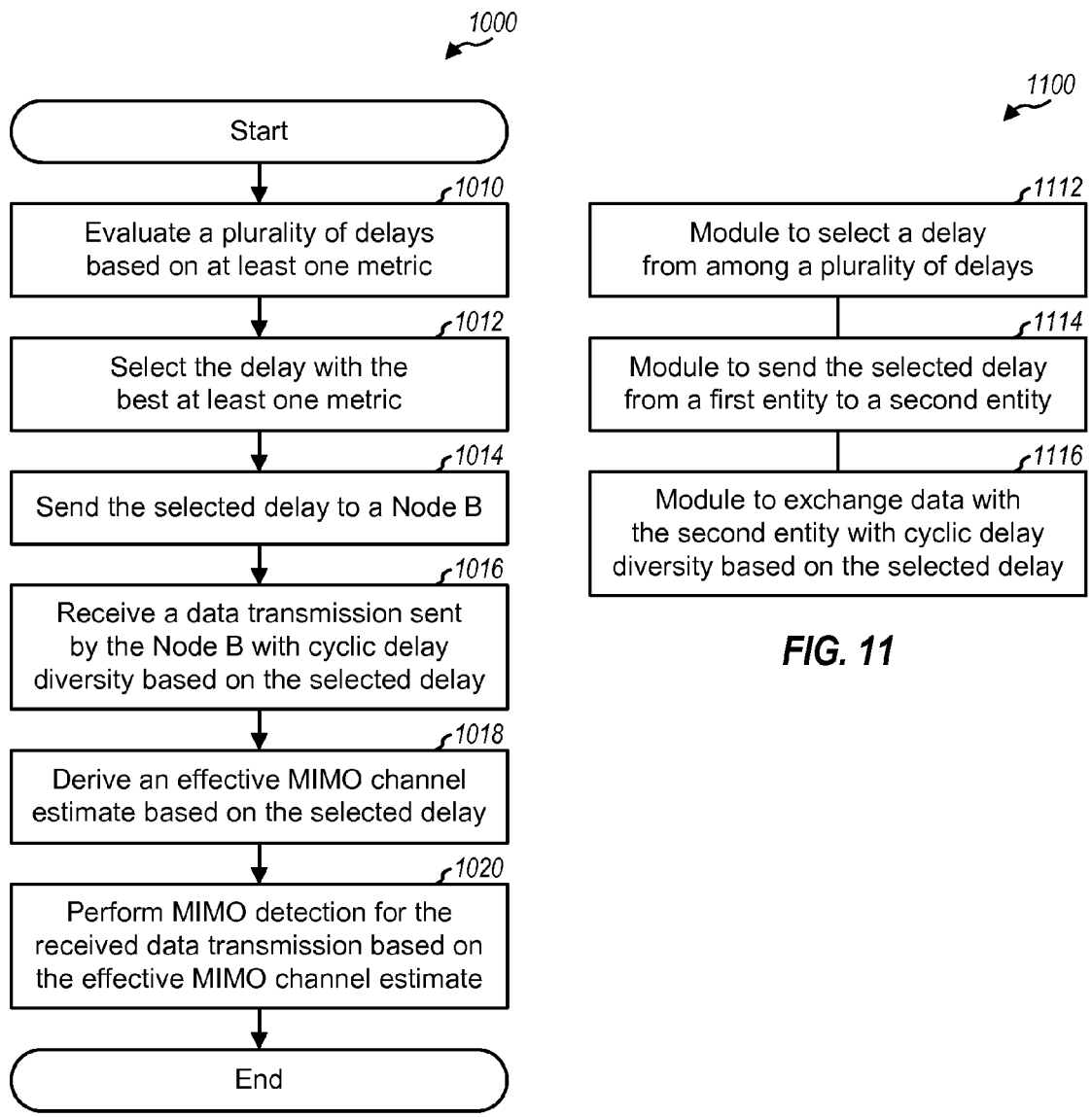

CYCLIC DELAY DIVERSITY AND PRECODING FOR WIRELESS COMMUNICATION

The present application claims priority to provisional U.S. Application Ser. No. 60/888,494, entitled "EFFICIENT CYCLIC DELAY DIVERSITY BASED PRECODING," filed Feb. 6, 2007, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support multiple-input multiple-output (MIMO) transmission. For MIMO, a transmitter may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reliability. In any case, it is desirable to send a MIMO transmission in a manner to achieve good performance.

SUMMARY

Techniques for sending a MIMO transmission using a combination of cyclic delay diversity and precoding are described herein. In an aspect, a set of delays for cyclic delay diversity and a set of precoding matrices may be supported. A combination of precoding matrix and delay may be selected based on one or more criteria such as data performance, rank, geometry, mobility, channel type, feedback reliability, etc. In one design, the set of delays includes zero delay, a small delay of less than a cyclic prefix length, and a large delay of greater than the cyclic prefix length. The large delay may correspond to a cyclic delay of K/L, where K is the number of samples for a useful portion of an OFDM symbol and L is the number of antennas to apply cyclic delay diversity, which may be virtual antennas or physical antennas. L is also referred to as the rank.

In one design, a first entity (e.g., a transmitter or a receiver) may select a delay from the set of delays and may send the selected delay to a second entity (e.g., the receiver or transmitter). The first entity may thereafter exchange data with (e.g., send data to or receive data from) the second entity based on the selected delay.

In one design, the first entity is a Node B and the second entity is a UE. The Node B may select the delay specifically for the UE and may send the selected delay to the UE. Alternatively, the Node B may select the delay for a set of UEs served by the Node B and may broadcast the selected delay to these UEs. In one design, the Node B may perform precoding with a precoding matrix and then perform processing for cyclic delay diversity based on the selected delay. In another design, the Node B may perform processing for cyclic delay diversity based on the selected delay and then perform precoding with the precoding matrix. Precoding refers to spatial processing to obtain virtual antennas from physical antennas.

In another design, the first entity is a UE and the second entity is a Node B. The UE may evaluate the set of precoding matrices and the set of delays based on at least one metric, e.g., a sum-capacity metric. The UE may determine a combination of precoding matrix and delay with the best performance and may send the precoding matrix and delay in this combination to the Node B. The UE may thereafter receive a data transmission sent by the Node B based on the selected precoding matrix and delay. The UE may derive an effective MIMO channel estimate based on the selected precoding matrix and delay and may then perform MIMO detection based on the effective MIMO channel estimate.

Various aspects and features of the disclosure are described in further detail below.

BRIEF DESCRIPTION OF THE DRAWINGS

FIG. 10 shows a process performed by the UE for data reception.

FIG. 11 shows an apparatus for exchanging data.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

Figure 1:
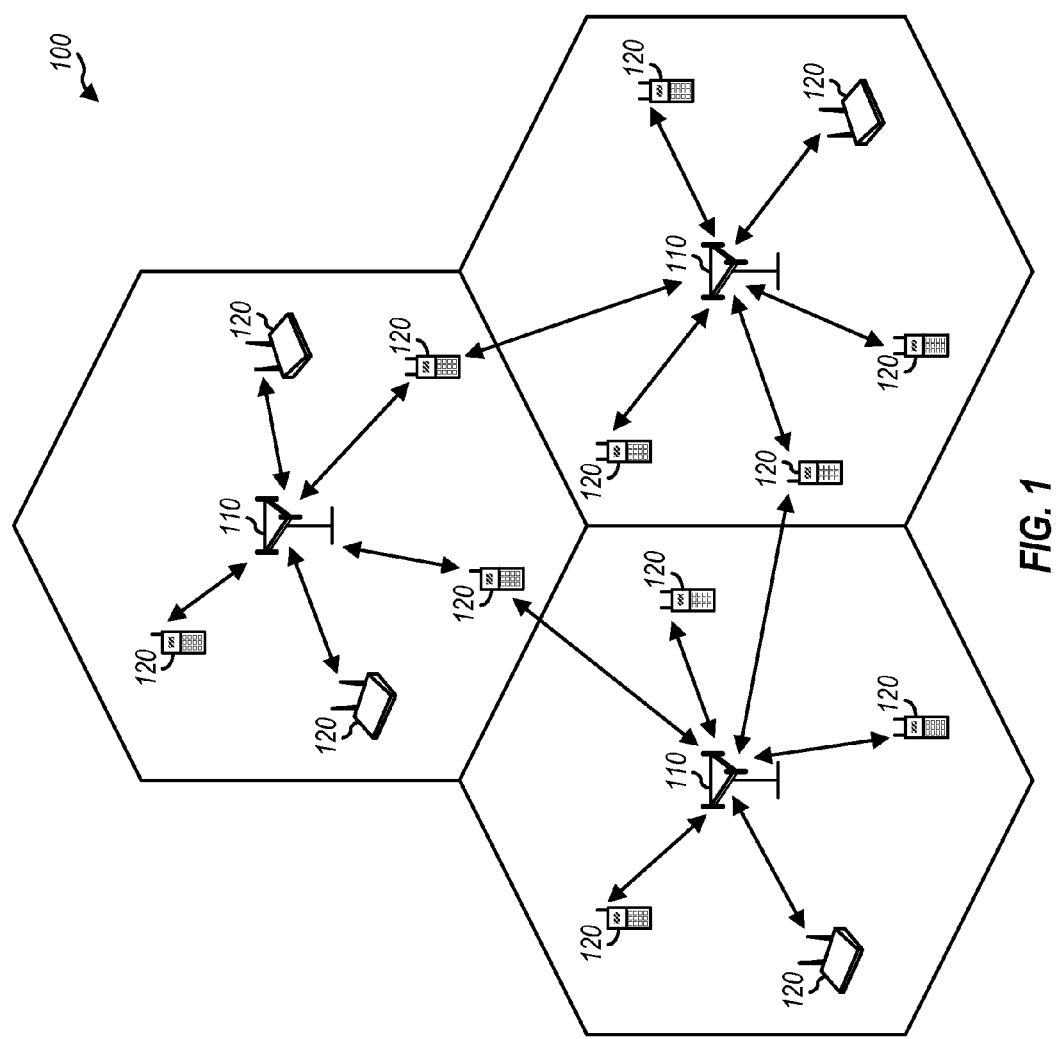
FIG. 1 shows a wireless multiple-access communication system.

FIG. 1 shows a wireless multiple-access communication system 100 with multiple Node Bs 110 and multiple user equipments (UEs). A Node B may be a fixed station that communicates with the UEs and may also be referred to as an evolved Node B (eNB), a base station, an access point, etc. Each Node B 110 provides communication coverage for a particular geographic area. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmission on the downlink and uplink. The downlink (or forward link) refers to the communication link from the Node Bs to the UEs, and the uplink (or reverse link) refers to the communication link from the UEs to the Node Bs.

The techniques described herein may be used for MIMO transmission on the downlink as well as the uplink. For clarity, certain aspects of the techniques are described below for MIMO transmission on the downlink in LTE. LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM.

Figure 2:
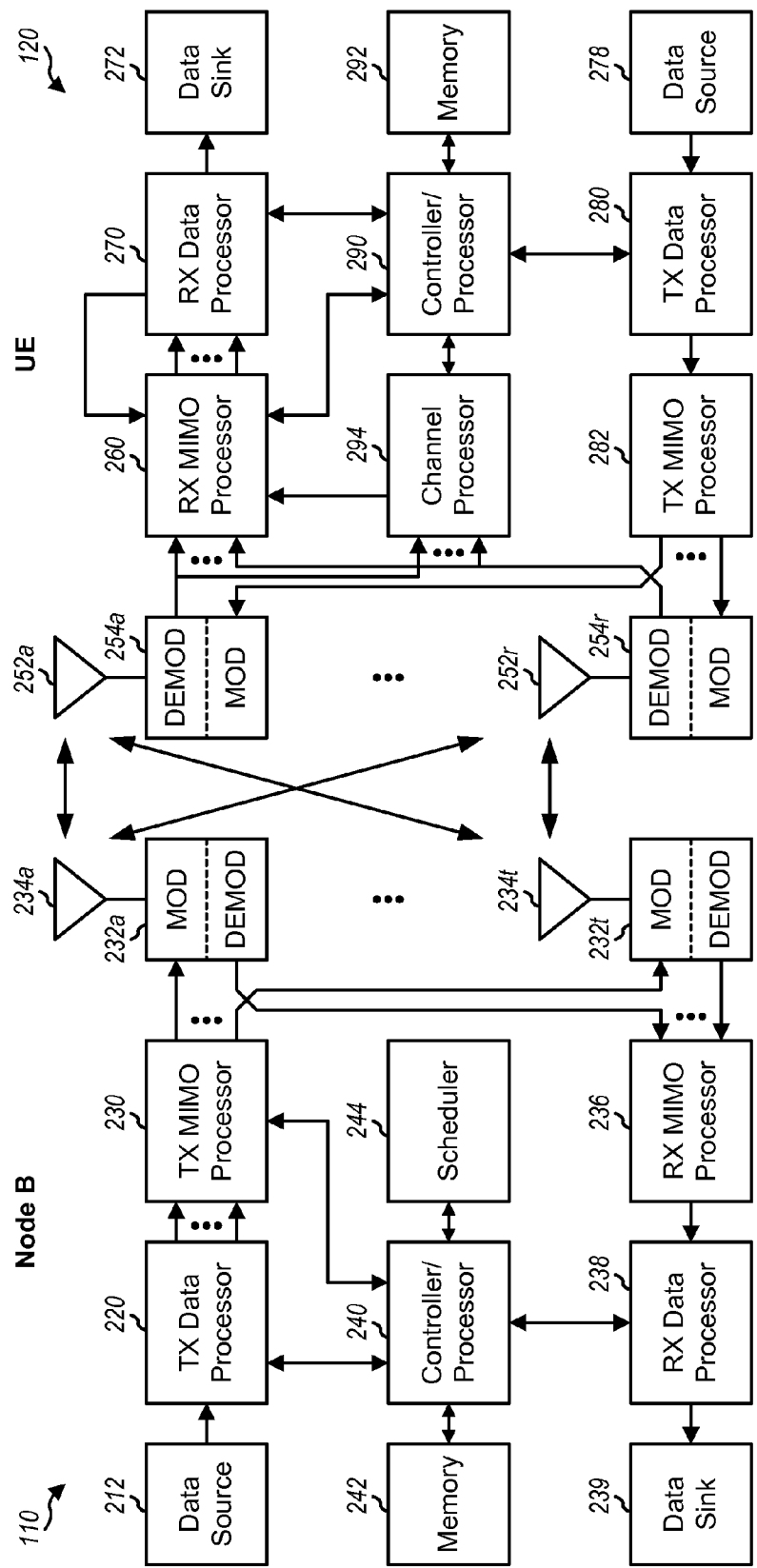
FIG. 2 shows a block diagram of a Node B and a UE.

FIG. 2 shows a block diagram of a design of a Node B 110 and a UE 120, which are one of the Node Bs and one of the UEs in FIG. 1. Node B 110 is equipped with multiple (T) antennas 234a through 234t. UE 120 is equipped with multiple (R) antennas 252a through 252r. Each of antennas 234 and 252 may be considered as a physical antenna.

At Node B 110, a TX data processor 220 may receive data from a data source 212, process (e.g., encode and symbol map) the data based on one or more modulation and coding schemes, and provide data symbols. As used herein, a data symbol is a symbol for data, a pilot symbol is a symbol for pilot, and a symbol may be a real or complex value. The data and pilot symbols may be modulation symbols from a modulation scheme such as PSK or QAM. Pilot is data that is known a priori by both the Node B and UE. A TX MIMO processor 230 may process the data and pilot symbols as described below and provide T output symbol streams to T modulators (MOD) 232a through 232t. Each modulator 232 may process its output symbol stream (e.g., for OFDM) to obtain an output sample stream. Each modulator 232 may further condition (e.g., convert to analog, filter, amplify, and upconvert) its output sample stream and generate a downlink signal. T downlink signals from modulators 232a through 232t may be transmitted via antennas 234a through 234t, respectively.

At UE 120, R antennas 252a through 252r may receive the T downlink signals from Node B 110, and each antenna 252 may provide a received signal to an associated demodulator (DEMOD) 254. Each demodulator 254 may condition (e.g., filter, amplify, downconvert, and digitize) its received signal to obtain samples and may further process the samples (e.g., for OFDM) to obtain received symbols. Each demodulator 254 may provide received data symbols to an RX MIMO processor 260 and provide received pilot symbols to a channel processor 294. Channel processor 294 may estimate the response of the MIMO channel from Node B 110 to UE 120 based on the received pilot symbols and provide a MIMO channel estimate to RX MIMO processor 260. RX MIMO processor 260 may perform MIMO detection on the received data symbols based on the MIMO channel estimate and provide detected symbols, which are estimates of the transmitted data symbols. An RX data processor 270 may process (e.g., symbol demap and decode) the detected symbols and provide decoded data to a data sink 272.

UE 120 may evaluate the channel conditions and generate feedback information, which may comprise various types of information as described below. The feedback information and data from a data source 278 may be processed (e.g., encoded and symbol mapped) by a TX data processor 280, spatially processed by a TX MIMO processor 282, and further processed by modulators 254a through 254r to generate R uplink signals, which may be transmitted via antennas 252a through 252r. At Node B 110, the R uplink signals from UE 120 may be received by antennas 234a through 234t, processed by demodulators 232a through 232t, spatially processed by an RX MIMO processor 236, and further processed (e.g., symbol demapped and decoded) by an RX data processor 238 to recover the feedback information and data sent by UE 120. Controller/processor 240 may control data transmission to UE 120 based on the feedback information.

Controllers/processors 240 and 290 may direct the operation at Node B 110 and UE 120, respectively. Memories 242 and 292 may store data and program codes for Node B 110 and UE 120, respectively. A scheduler 244 may schedule UE 120 and/or other UEs for data transmission on the downlink and/or uplink based on the feedback information received from all UEs.

Node B 110 may transmit L data symbols simultaneously via L layers on each subcarrier in each symbol period, where in general L≥1. A layer may correspond to one spatial dimension for each subcarrier used for transmission. Node B 110 may transmit data symbols using various transmission schemes.

In one design, Node B 110 may process the data symbols for each subcarrier k as follows:

$$y(k) = D(k)WUx(k), \quad \text{Eq (1)}$$

where
- $x(k)$ is an L×1 vector containing L data symbols to be sent via L layers on subcarrier k in one symbol period,
- U is an L×L layer-to-virtual antenna mapping matrix,
- W is a T×L precoding matrix,
- $D(k)$ is a T×T cyclic delay matrix for subcarrier k, and
- $y(k)$ is a T×1 vector containing T output symbols for the T transmit antennas on subcarrier k in one symbol period.

Equation (1) is for one subcarrier k. The same processing may be performed for each subcarrier used for transmission. In the description herein, a matrix may have one or multiple columns.

The precoding matrix W may be used to form up to T virtual antennas with T physical antennas 234a through 234t. Each virtual antenna may be formed with one column of W. A data symbol may be multiplied by one column of W and may then be sent on one virtual antenna and all T physical antennas. W may be based on a Fourier matrix or some other matrix. W may be selected from a set of precoding matrices.

The layer-to-virtual antenna mapping matrix U may be used to map the data symbols for the L layers to L virtual antennas selected from the T available virtual antennas. U may be defined based on a layer to virtual antenna mapping selected for use, as described below. U may also be an identity matrix I with ones along the diagonal and zeros elsewhere. The same or different mapping matrices may be used for the K subcarriers.

The cyclic delay matrix D(k) may be used to achieve cyclic delay diversity, which may provide beamforming gain, frequency selective scheduling gain, and/or diversity gain. D(k) may also be used to achieve layer permutation, which may have certain advantages. D(k) may be selected and applied as described below.

In the design shown in equation (1), the precoding with W is performed prior to the processing with D(k). Cyclic delay diversity is thus applied to physical antennas instead of virtual antennas formed with the precoding matrix W. This design may be used mainly for zero delay and small delay but may also be used for large delay.

Figure 3A:
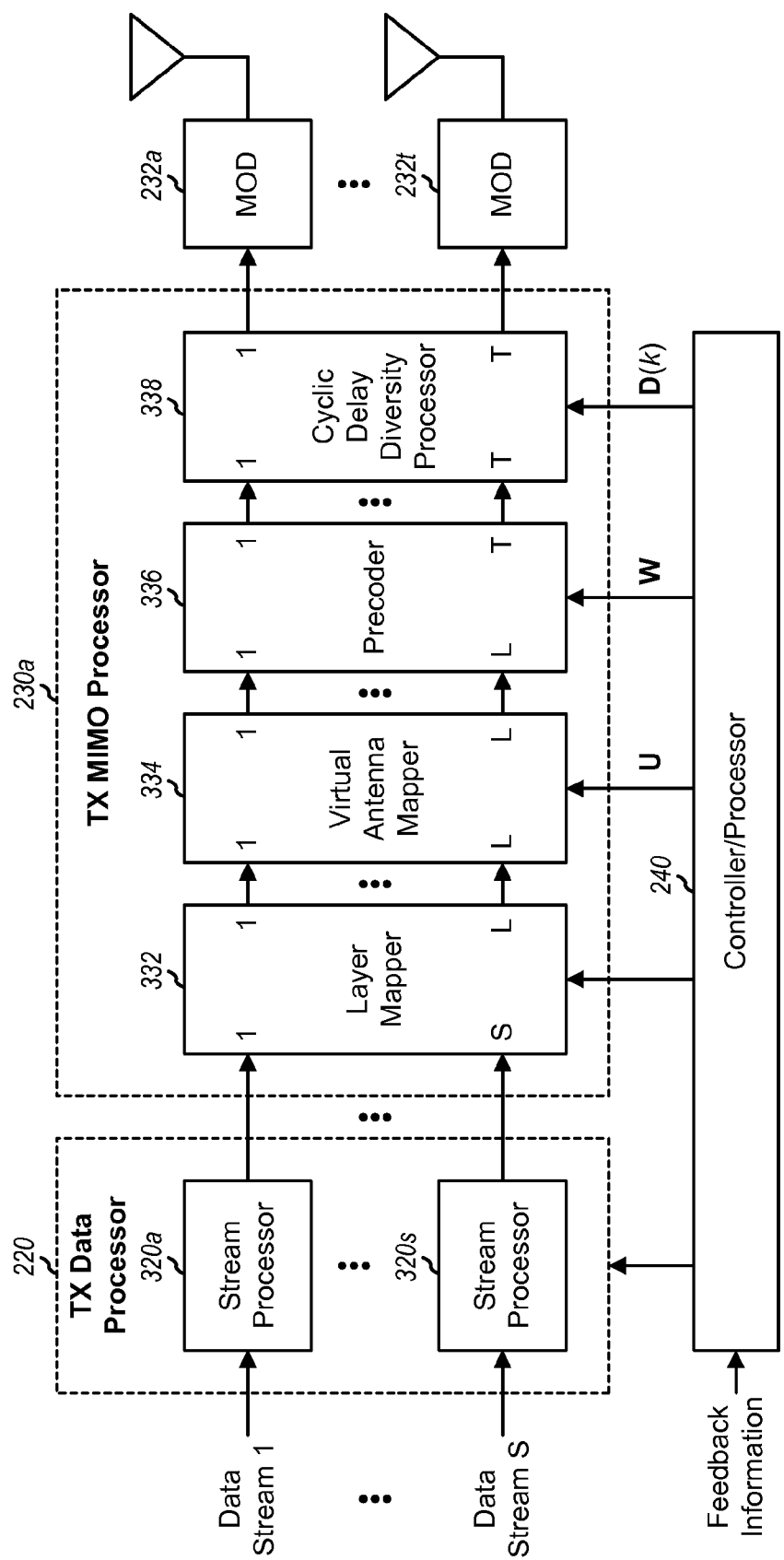
FIGS. 3A and 3B show two designs of a transmit (TX) MIMO processor.

FIG. 3A shows a block diagram of a TX MIMO processor 230a, which implements equation (1) and is one design of TX MIMO processor 230 at Node B 110 in FIG. 2. Within TX data processor 220, S stream processors 320a through 320s may receive S data streams from data source 212, where in general S≥1. Each stream processor 320 may encode, interleave, scramble, and symbol map its data stream to obtain data symbols. Each data stream may carry one transport block or packet in each transmission time interval (TTI). Each stream processor 320 may process its transport block to obtain a codeword and may then map the codeword to a block of modulation symbols. The terms "data stream", "transport block", "packet" and "codeword" may be used interchangeably. Stream processors 320a through 320s may provide S data symbol streams.

Within TX MIMO processor 230a, a layer mapper 332 may map the data symbols for the S data streams to L layers selected for use. A virtual antenna mapper 334 may map the data symbols for the L layers to subcarriers and virtual antennas used for transmission. Mappers 332 and 334 may also be combined into one mapper. A precoder 336 may multiply the mapped symbols for each subcarrier with the precoding matrix W and provide precoded symbols for that subcarrier. A cyclic delay diversity processor 338 may multiply the precoded symbols for each subcarrier with the cyclic delay matrix D(k) to obtain output symbols for that subcarrier. Cyclic delay diversity processor 338 may provide T output symbol streams to T modulators 232a through 232t.

Each modulator 232 may perform OFDM modulation for a respective output symbol stream. Within each modulator 232, K output symbols to be sent on the K total subcarriers in one OFDM symbol period may be transformed with a K-point inverse discrete Fourier transform (IDFT) to obtain a useful portion containing K time-domain samples. Each time-domain sample is a complex value to be transmitted in one sample period. The last C samples of the useful portion may be copied and appended to the front of the useful portion to form an OFDM symbol containing K+C samples. The copied portion is referred to as a cyclic prefix and is used to combat inter-symbol interference (ISI) caused by frequency selective fading. Each modulator 232 may further process its sample stream to generate a downlink signal.

Controller/processor 240 may receive feedback information from UE 120 and generate controls for stream processors 320 and mappers 332 and 334. Controller/processor 240 may also provide the precoding matrix W to precoder 336 and the cyclic delay matrix D(k) to processor 338.

In another design, Node B 110 may process the data symbols for each subcarrier k as follows:

$$y(k)=WD(k)Ux(k),\quad\quad\quad\text{Eq (2)}$$

where D(k) is an L×L cyclic delay matrix for subcarrier k.

In the design shown in equation (2), the processing with D(k) is performed prior to the precoding with W. Cyclic delay diversity is thus applied to virtual antennas instead of physical antennas. This design may be used mainly for large delay but may also be used for zero delay and small delay.

Figure 3B:
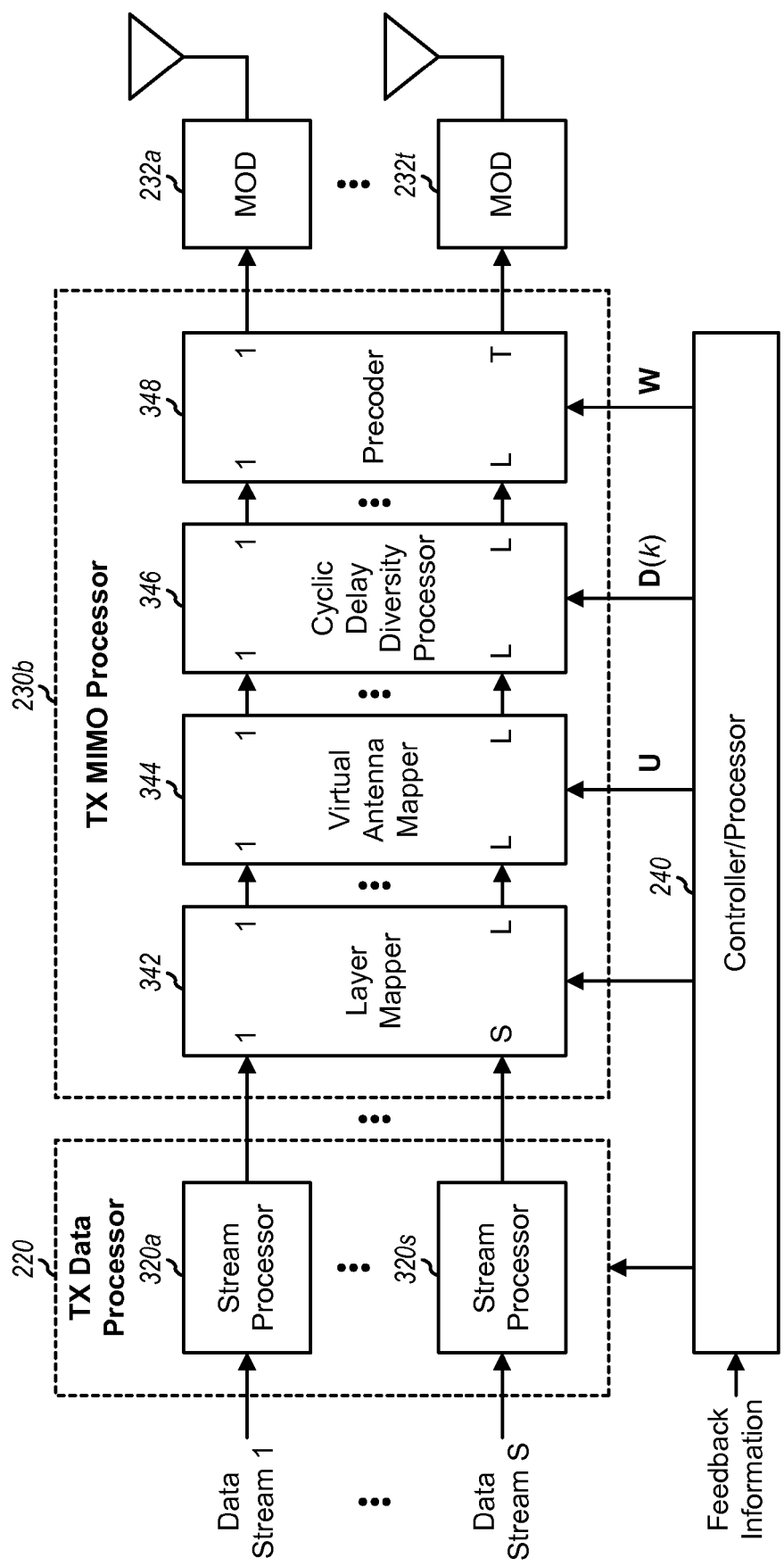

FIG. 3B shows a block diagram of a TX MIMO processor 230b, which implements equation (2) and is another design of TX MIMO processor 230 at Node B 110 in FIG. 2. Within TX MIMO processor 230b, a layer mapper 342 may map the data symbols for the S data streams to L layers selected for use. A virtual antenna mapper 344 may map the data symbols for the L layers to subcarriers and virtual antennas. A cyclic delay diversity processor 346 may multiply the mapped symbols for each subcarrier with the cyclic delay matrix D(k). A precoder 348 may multiply the symbols from processor 346 for each subcarrier with the precoding matrix W to obtain output symbols for that subcarrier. Precoder 348 may provide T output symbol streams to T modulators 232a through 232t.

Figure 4:
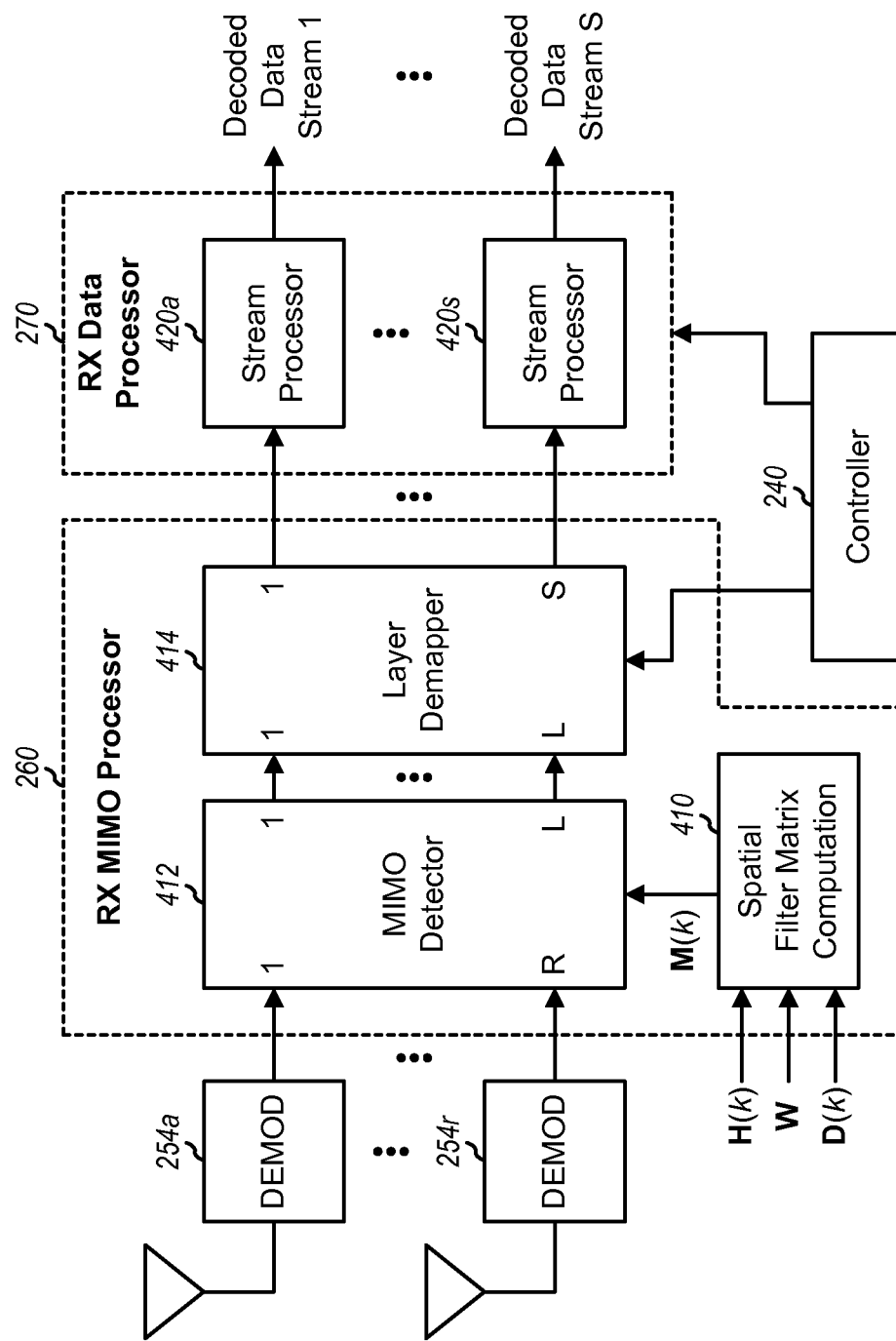
FIG. 4 shows a design of a receive (RX) MIMO processor.

FIG. 4 shows a block diagram of a design of RX MIMO processor 260 and RX data processor 270 at UE 120 in FIG. 2. Within RX MIMO processor 260, a computation unit 410 may receive a MIMO channel estimate H(k) from channel estimator 294 and the precoding matrix W, the cyclic delay matrix D(k), and the mapping matrix U selected for use. Unit 410 may compute an effective MIMO channel estimate, as follows:

$$H_{eff}(k)=H(k)D(k)WU,\text{or}\quad\quad\quad\text{Eq (3)}$$

$$H_{eff}(k)=H(k)WD(k)U.\quad\quad\quad\text{Eq (4)}$$

where $H_{eff}(k)$ is an R×T estimated MIMO channel matrix for subcarrier k.

Equation (3) may be used if the Node B performs precoding and cyclic delay diversity processing as shown in equation (1). Equation (4) may be used if the Node B performs precoding and cyclic delay diversity processing as shown in equation (2). D(k)W and W D(k) may be considered as extended precoding matrices. Unit 410 may then compute a spatial filter matrix M(k) for each subcarrier k based on $H_{eff}(k)$ and in accordance with minimum mean square error (MMSE), linear MMSE (LMMSE), zero-forcing (ZF), or some other MIMO detection technique.

A MIMO detector 412 may obtain R received symbol streams from R demodulators 254a through 254r. MIMO detector 412 may perform MIMO detection on the R received symbol streams with the spatial filter matrix M(k) for each subcarrier k and provide L detected symbol streams for the L selected virtual antennas. A layer demapper 414 may demap the L detected symbol streams (which may include an inverse permutation) in a manner complementary to the mapping performed by layer mapper 332 in FIG. 3A or mapper 342 in FIG. 3B. Demapper 414 may provide S detected symbol streams for the S data streams.

RX data processor 270 includes S stream processors 420a through 420s for the S data streams. Each stream processor 420 may symbol demap, descramble, deinterleave, and decode its detected symbol stream and provide a decoded data stream.

Various types of precoding matrix may be used for the designs shown in equations (1) and (2). In one design, a set of Q precoding matrices may be defined as follows:

$$W_i=\Lambda_i F,\text{for }i=0,\ldots,Q-1,\quad\quad\quad\text{Eq (5)}$$

where

F is a Fourier matrix, $\Lambda_i$ is the i-th phase shift matrix, and $W_i$ is the i-th precoding matrix.

Precoding matrix $W_i$ may also be denoted as $P_i$.

The elements of a T×T Fourier matrix F may be expressed as:

$$f_{u,v} = e^{-j2\pi \frac{u \cdot v}{T}}, \text{ for } u = 0, \ldots, T-1 \text{ and } v = 0, \ldots, T-1, \quad \text{Eq (6)}$$

where $f_{u,v}$ is the element in the u-th row and v-th column of the Fourier matrix.

In one design, the phase shift matrix $\Lambda_i$ may be expressed as:

$$\Lambda_i = \begin{bmatrix} e^{j\lambda_{i,0}} & 0 & \cdots & 0 \\ 0 & e^{j\lambda_{i,1}} & \cdots & 0 \\ \vdots & \vdots & \ddots & \vdots \\ 0 & 0 & \cdots & e^{j\lambda_{i,T-1}} \end{bmatrix}, \quad \text{Eq (7)}$$

where $\lambda_{i,v}$ is a phase for the v-th antenna in the i-th phase shift matrix. Q different phase shift matrices may be defined with different phases $\lambda_{i,v}$ and/or by rotating one or more base matrices.

For the design shown in equation (5), Q different T×T precoding matrices $W_i$ may be defined based on the Fourier matrix F and Q different phase shift matrices $\Lambda_i$. For selective virtual antenna transmission, different combinations of columns (or submatrices) of the Q precoding matrices may be evaluated, and the L columns of the precoding matrix $W_i$ that provide the best performance may be used as the T×L precoding matrix W, where in general $1 \leq L \leq T$. The selection of W is described below.

For 2×2 MIMO configuration with two transmit antennas and two receive antennas, $W_i$ may be expressed as:

$$W_i = \Lambda_i F = \begin{bmatrix} e^{j\lambda_{i,0}} & 0 \\ 0 & e^{j\lambda_{i,1}} \end{bmatrix} \begin{bmatrix} 1 & 1 \\ 1 & -1 \end{bmatrix}. \quad \text{Eq (8)}$$

The precoding matrix W may include one or both columns of $W_i$.

For 4×4 MIMO configuration with four transmit antennas and four receive antennas, $W_i$ may be expressed as:

$$W_i = \Lambda_i F = \begin{bmatrix} e^{j\lambda_{i,0}} & 0 & 0 & 0 \\ 0 & e^{j\lambda_{i,1}} & 0 & 0 \\ 0 & 0 & e^{j\lambda_{i,2}} & 0 \\ 0 & 0 & 0 & e^{j\lambda_{i,3}} \end{bmatrix} \begin{bmatrix} 1 & 1 & 1 & 1 \\ 1 & j & -1 & -j \\ 1 & -1 & 1 & -1 \\ 1 & -j & -1 & j \end{bmatrix}. \quad \text{Eq (9)}$$

The precoding matrix W may include one, two, three or all four columns of $W_i$.

In the design shown in equations (5) through (9), $W_i$ may be considered as a Fourier-based frequency-invariant precoding matrix. The set of precoding matrices may also be defined in other manners, e.g., $W_i = F^H \Lambda_i F$, where "H" denotes a conjugate transpose. The set of precoding matrices may also be defined with other unitary or non-unitary matrices instead of, or in additional to, the Fourier matrix. The set of precoding matrices may also include the identity matrix I, which may be used to transmit each layer on one physical antenna.

In one design, a set of cyclic delay matrices may be defined for a set of delays. For each delay, a zero phase ramp may be applied to antenna 0, and V−1 non-zero phase ramps may be defined for antennas 1 through V−1. If cyclic delay diversity processing is performed prior to precoding as shown in FIG. 3B, then V=L, and the V antennas correspond to L selected virtual antennas. If cyclic delay diversity processing is performed after precoding as shown in FIG. 3A, then V=T, and the V antennas correspond to T physical antennas. The dimension of the cyclic delay matrix D(k) may thus be dependent on whether cyclic delay diversity processing is performed prior to or after precoding. For clarity, much of the following description assumes that cyclic delay diversity processing is performed prior to preceding, and D(k) has dimension of L×L.

In one design, the set of cyclic delay matrices may be defined as:

$$D_m(k) = \begin{bmatrix} 1 & 0 & \cdots & 0 \\ 0 & e^{-j\theta_{m,1}k} & \cdots & 0 \\ \vdots & \vdots & \ddots & \vdots \\ 0 & 0 & \cdots & e^{-j\theta_{m,L-1}k} \end{bmatrix}, \text{ for } m = 0, \ldots, M-1, \quad \text{Eq (10)}$$

where
$\theta_{m,v}$ is a phase ramp for the v-th antenna for the m-th delay, and
$D_m(k)$ is a cyclic delay matrix for the m-th delay.

In the design shown in equation (10), the phase ramp for each antenna may be based on an arbitrary cyclic delay value. The cyclic delay matrix $D_m(k)$ may also be denoted as $\Lambda_m(k)$ or $\Lambda_i(k)$.

In another design, the set of cyclic delay matrices may be defined as:

$$D_m(k) = \begin{bmatrix} 1 & 0 & \cdots & 0 \\ 0 & e^{-j\frac{2\pi \tau_m k}{K}} & \cdots & 0 \\ \vdots & \vdots & \ddots & \vdots \\ 0 & 0 & \cdots & e^{-j\frac{2\pi(L-1)\tau_m k}{K}} \end{bmatrix}, \quad \text{Eq (11)}$$

where $\tau_m$ is the m-th delay, which is also the delay spacing between consecutive antennas. In the design shown in equation (11), the cyclic delay value $\tau_{m,v}$ and the phase ramp $\theta_{m,v}$ of each antenna v may be expressed as:

$$\tau_{m,v} = \tau_m \cdot v, \text{ for } v = 0, \ldots, L-1, \text{ and} \quad \text{Eq (12)}$$

$$\theta_{m,v} = \frac{2\pi}{K} \tau_m \cdot v, \text{ for } v = 0, \ldots, L-1. \quad \text{Eq (13)}$$

Equation (11) is a special case of equation (10) with a uniform spacing of $\tau_m$ for the cyclic delay values of different antennas. The uniform delay spacing may reduce signaling overhead since the cyclic delay values $\tau_{m,0}$ through $\tau_{m,L-1}$ of all L antennas may be defined based on a single $\tau_m$ value.

In one design, a set of M=3 delays may be defined to include the following:

$$\tau_0 = 0, \text{ for zero delay,} \quad \text{Eq (14)}$$

$$\tau_1 = 2, \text{ for small delay, and} \quad \text{Eq (15)}$$

$$\tau_2 = \frac{K}{L}, \text{ for large delay.} \quad \text{Eq (16)}$$

The small delay may be used to improve beamforming and frequency selective scheduling gain and may be especially beneficial for low mobility channel, low geometry channel, low rank channel, etc. The large delay may be used to improve transmit diversity gain and may be suitable for high mobility channel (e.g., for a mobile UE moving at 30 km/hr or faster), high geometry channel, higher rank channel, more coarse feedback in time or frequency, etc. The large delay may provide similar performance as the zero delay in low mobility channel, which may enhance robustness of the system when feedback information is noisy. Geometry is related to signal-to-noise-and-interference ratio (SINR). Low geometry may correspond to low SINRs, and high geometry may correspond to high SINRs. Rank refers to the number of virtual antennas selected for use and is also referred to as spatial multiplexing order. In one design, zero delay or small delay may be used for a rank-1 transmission, and large delay may be used for rank-2 or higher transmission. The cyclic delay diversity processing with large delay may equalize the SINRs of the L layers used for data transmission.

In general, cyclic delay matrices may be defined for any number of delays and any particular delay. For example, cyclic delay matrices may be defined for small delay of $\tau_m=1$ or some other value, for large delay of less than K/L or more than K/L, etc. In general, a small delay may be any delay smaller than the cyclic prefix length, and a large delay may be any delay larger than the cyclic prefix length. For clarity, much of the description below is for the design shown in equations (14) through (16).

Table 1 provides the cyclic delay matrices for zero delay, small delay, and large delay for different numbers of layers when the cyclic delay matrices are applied as shown in equation (2). A similar table may be generated for the cyclic delay matrices for zero delay, small delay, and large delay for different numbers of physical antennas (T) when the cyclic delay matrices are applied as shown in equation (1).

The cyclic delay matrix D(k) may be applied in the frequency domain and may be a function of subcarrier k. The processing with D(k) in the frequency domain, with uniform delay spacing of $\tau_m$, may be equivalent to performing cyclic shift of $\tau_m \cdot v$ samples in the time domain for antenna v.

For zero delay with $\tau_0=0$, the cyclic delay matrices $D_0(k)$ in the second column of Table 1 are identity matrices. Hence, no phase ramp or cyclic delay is applied for each antenna.

For small delay with $\tau_1=2$, each cyclic delay matrix $D_1(k)$ in the third column of Table 1 provides a small phase ramp (i.e., a small linear phase shift) across the K subcarriers on each antenna. The slope of the phase ramp is different for different antennas, with antenna 0 having no phase ramp and antenna L-1 having the largest phase ramp. Applying a phase ramp in the frequency domain is equivalent to performing a cyclic shift of the samples in the useful portion of an OFDM symbol in the time domain. For $\tau_1=2$, the samples in the useful portion may be cyclically shifted by zero samples for virtual antenna 0, two samples for virtual antenna 1, four samples for virtual antenna 2, six samples for virtual antenna 3, etc.

For large delay with $\tau_2=K/L$, each cyclic delay matrix $D_2(k)$ provides a large linear phase shift across the K subcarriers on each antenna. Equivalently, the samples in the useful portion may be cyclically shifted by an integer multiple of K/L samples (or an integer multiple of K/L samples in the useful portion) for each antenna.

Figure 5A:
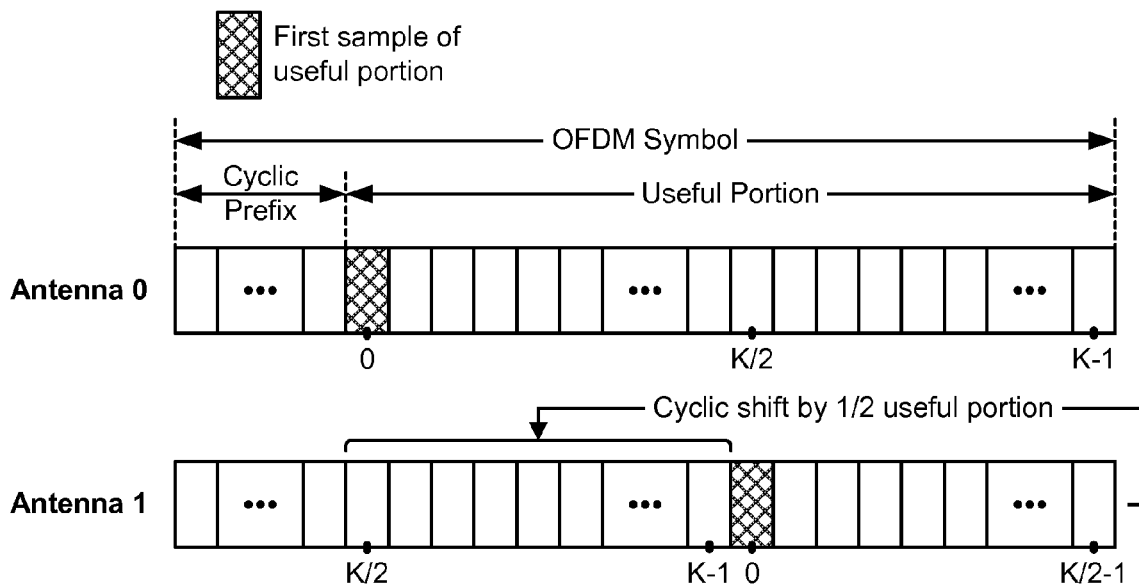
FIGS. 5A and 5B show cyclic delay diversity with large delay for 2 and 4 antennas, respectively.

FIG. 5A shows cyclic delay diversity with large delay in the time domain corresponding to processing with $D_2(k)$ in the frequency domain for L=2 antennas. The useful portion may be cyclically shifted by zero samples for antenna 0 and one half of the useful portion for antenna 1.

Figure 5B:
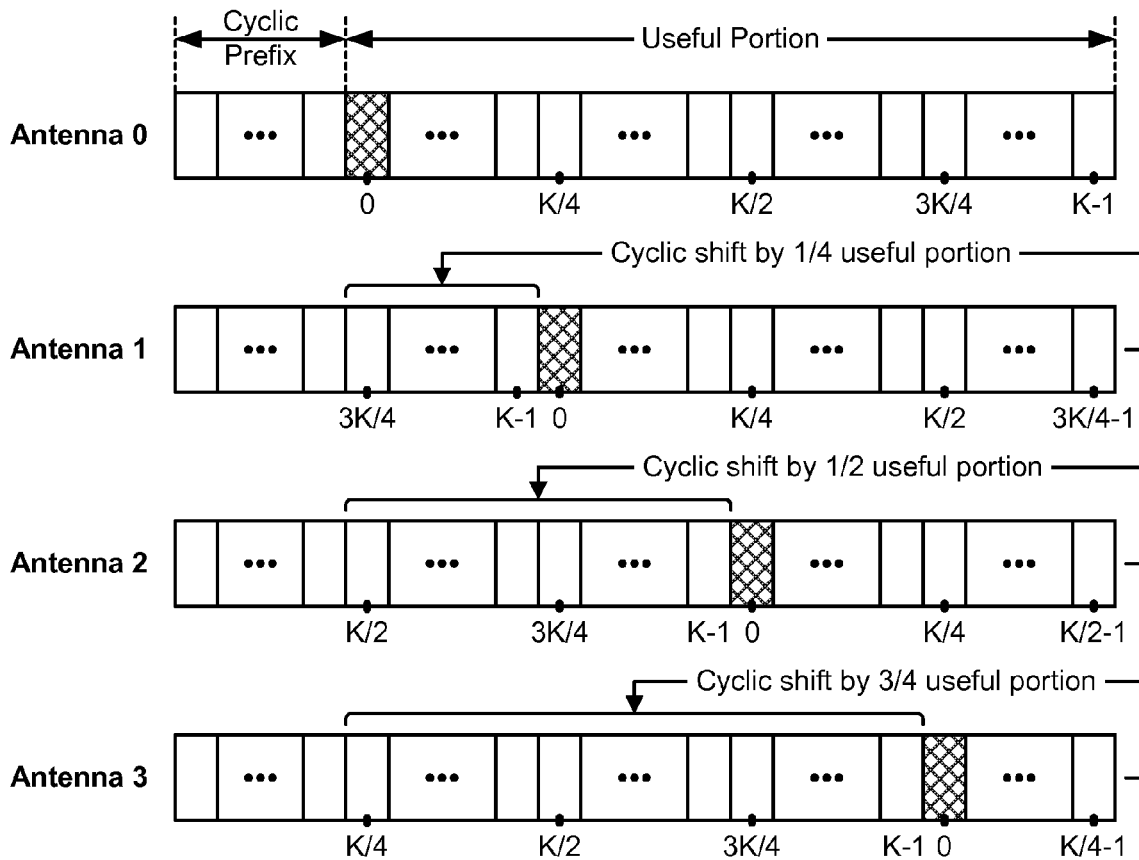

FIG. 5B shows cyclic delay diversity with large delay in the time domain corresponding to processing with $D_2(k)$ in the frequency domain for L=4 antennas. The useful portion may be cyclically shifted by zero samples for antenna 0, one quarter of the useful portion for antenna 1, one half of the useful portion for antenna 2, and three quarter of the useful portion for antenna 3.

TABLE 1

Cyclic delay matrices

| Number of Layers | Zero Delay $\tau_0 = 0$ $D_0(k)$ | Small Delay $\tau_1 = 2$ $D_1(k)$ | Large Delay $\tau_2 = \frac{K}{L}$ $D_2(k)$ |
|---|---|---|---|
| 1 | $[1]$ | $[1]$ | $[1]$ |
| 2 | $\begin{bmatrix} 1 & 0 \\ 0 & 1 \end{bmatrix}$ | $\begin{bmatrix} 1 & 0 \\ 0 & e^{-j\frac{4\pi k}{K}} \end{bmatrix}$ | $\begin{bmatrix} 1 & 0 \\ 0 & e^{-j\frac{2\pi k}{2}} \end{bmatrix}$ |
| 3 | $\begin{bmatrix} 1 & 0 & 0 \\ 0 & 1 & 0 \\ 0 & 0 & 1 \end{bmatrix}$ | $\begin{bmatrix} 1 & 0 & 0 \\ 0 & e^{-j\frac{4\pi k}{K}} & 0 \\ 0 & 0 & e^{-j\frac{8\pi k}{K}} \end{bmatrix}$ | $\begin{bmatrix} 1 & 0 & 0 \\ 0 & e^{-j\frac{2\pi k}{3}} & 0 \\ 0 & 0 & e^{-j\frac{4\pi k}{3}} \end{bmatrix}$ |
| 4 | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\begin{bmatrix} 1 & 0 & 0 & 0 \\ 0 & e^{-j\frac{4\pi k}{K}} & 0 & 0 \\ 0 & 0 & e^{-j\frac{8\pi k}{K}} & 0 \\ 0 & 0 & 0 & e^{-j\frac{12\pi k}{K}} \end{bmatrix}$ | $\begin{bmatrix} 1 & 0 & 0 & 0 \\ 0 & e^{-j\frac{2\pi k}{4}} & 0 & 0 \\ 0 & 0 & e^{-j\frac{4\pi k}{4}} & 0 \\ 0 & 0 & 0 & e^{-j\frac{6\pi k}{4}} \end{bmatrix}$ |

FIGS. 5A and 5B illustrate time-domain processing for cyclic delay diversity, which may be applicable when cyclic delay diversity processing is performed after preceding, as shown in FIG. 3A. Frequency-domain processing for cyclic delay diversity, e.g., as shown in equation (2), may be applicable when cyclic delay diversity processing is performed before preceding, as shown in FIG. 3B.

It may be desirable to apply large delay on virtual antennas prior to preceding, e.g., as shown in equation (2) and FIG. 3B. Precoding gain may be lost if the large delay is applied on physical antennas after preceding. Zero delay or small delay may be applied either on virtual antennas prior to preceding, e.g., as shown in equation (2), or on physical antennas after preceding, e.g., as shown in equation (1).

The system may support selective virtual antenna permutation (S-VAP), which is a combination of selective virtual antenna and layer permutation. Selective virtual antenna refers to selection of L best virtual antennas for data transmission from among T available virtual antennas. Layer permutation refers to mapping of data symbols for each layer across the L selected virtual antennas in a circular manner through the K total subcarriers. Layer permutation may provide certain advantages such as (i) improved performance due to increased spatial diversity per layer and (ii) reduced feedback overhead due to similar channel conditions observed by all L layers. Layer permutation may be achieved by mapping the data symbols for each layer to appropriate subcarriers and virtual antennas, as described below. Layer permutation may also be implicitly achieved by performing processing with $D_2(k)$ for large delay shown in Table 1.

Figure 6A:
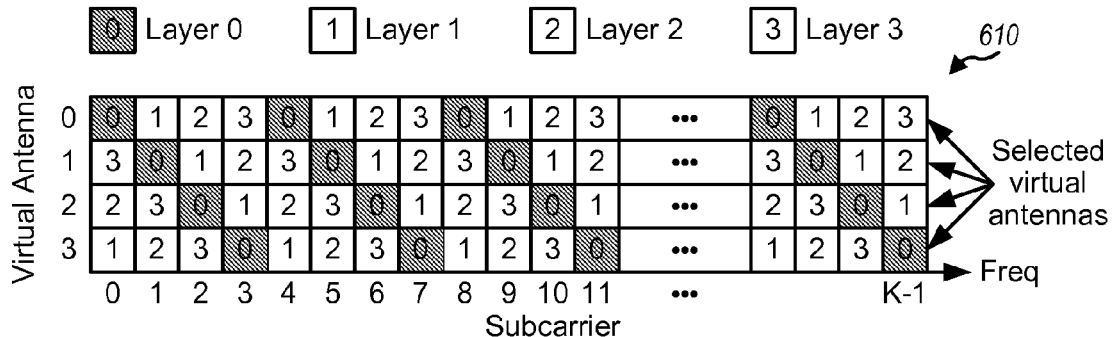
FIGS. 6A, 6B and 6C show transmission via four, three and two virtual antennas, respectively, with layer permutation.

FIG. 6A shows transmission on four layers via four virtual antennas with layer permutation. Four virtual antennas 0 through 3 may be available, and all four virtual antennas may be selected for use. The four layers may be mapped to the four virtual antennas based on a mapping pattern that maps each layer circularly across the four virtual antennas through the K subcarriers. Thus, layer 0 may be mapped to virtual antenna 0 on subcarriers 0, 4, and so on, to virtual antenna 1 on subcarriers 1, 5, and so on, to virtual antenna 2 on subcarriers 2, 6, and so on, and to virtual antenna 3 on subcarriers 3, 7, and so on. Each remaining layer also cycles through the four virtual antennas across the K subcarriers, as shown in FIG. 6A. Each layer is mapped across all four virtual antennas with layer permutation and may thus observe the average SINR of the four virtual antennas. The layer permutation in FIG. 6A may be achieved with $D_2(k)$ for four layers in Table 1.

Figure 6B:
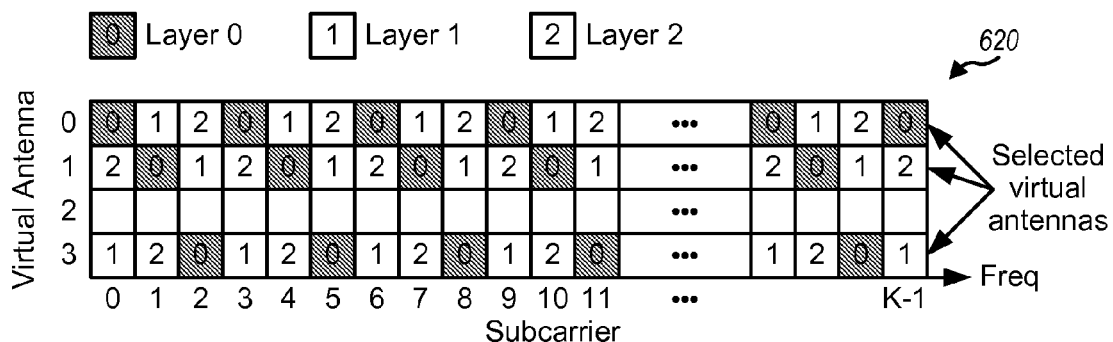

FIG. 6B shows transmission on three layers with layer permutation. Four virtual antennas 0 through 3 may be available, and one set of three virtual antennas {0, 1, 2}, {0, 1, 3}, {0, 2, 3} or {1, 2, 3} may be selected for use from among the four virtual antennas. In the example shown in FIG. 6B, virtual antennas 0, 1 and 3 are selected. Three layers may be mapped to the three selected virtual antennas with layer permutation, and each layer may be mapped across the three selected virtual antennas in a circular manner. The layer permutation in FIG. 6B may be achieved with $D_2(k)$ for three layers in Table 1.

Figure 6C:
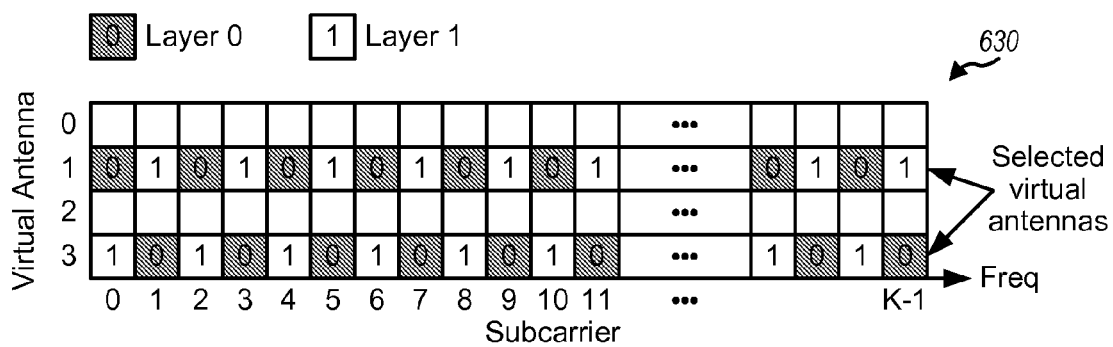

FIG. 6C shows transmission on two layers with layer permutation. Four virtual antennas 0 through 3 may be available, and one pair of virtual antennas {0, 1}, {0, 2}, {0, 3}, {1, 2}, {1, 3} or {2, 3} may be selected for use from among the four virtual antennas. In the example shown in FIG. 6C, virtual antennas 1 and 3 are selected. Two layers may be mapped to the two selected virtual antennas with layer permutation, and each layer may be mapped across both selected virtual antennas in a circular manner. The layer permutation in FIG. 6C may be achieved with $D_2(k)$ for two layers in Table 1.

For simplicity, FIGS. 6A to 6C show the mapping of layers across K total subcarriers. In general, the layers may be mapped across subcarriers used for transmission, which may be a subset of the K total subcarriers.

Different delays may be more suitable for different channel conditions. Various schemes may be used to select a suitable delay for use.

In a first scheme, the Node B may semi-statically determine and switch delay on a long-term basis. In one design, which may be referred to as cell-based cyclic delay diversity, the Node B may perform semi-static switching for all UEs in a cell and may apply a common delay for all UEs. The Node B may select a delay that can provide good performance for all UEs and may broadcast this delay to the UEs. In another design, which may be referred to as UE-based cyclic delay diversity, the Node B may perform semi-static switching independently for each UE and may apply different delays for different UEs. The Node B may select a delay that can provide good performance for each UE and may send this delay to the UE. For both designs, the Node B may select a precoding and cyclic delay diversity structure, e.g., equation (1) for zero delay and small delay and equation (2) for large delay.

The Node B may select a delay based on various criteria. In one design, the Node B may select the large delay when feedback information from the UEs is deemed unreliable. The large delay may maximize transmit diversity (regardless of the number of layers) and may potentially reduce the number of precoding matrices and/or CQI feedback. The Node B may select the small delay when frequency selective beamforming gain is desired.

In one design, which may be referred to as rank-specific cyclic delay diversity, the Node B may select a delay based on the rank of a transmission. In one design, a set of delay combinations may be defined, with each combination including one delay for each rank. One delay combination may be selected for use and signaled to the affected UE(s).

In one design for 2×2 MIMO configuration, the set of delay combinations may include the following:

(0, 0), (0, K/2), (K/2, 0) and (K/2, K/2), where combination (a, b) means that a delay of a is used for rank 1 and a delay of b is used for rank 2.

For combination (0, 0), the Node B applies no delay for both ranks 1 and 2. For combination (0, K/2), the Node B applies no delay for rank 1 and large delay for rank 2. This combination achieves layer permutation when rank 2 is selected. For combination (K/2, 0), the Node B applies large delay for rank 1 and no delay for rank 2. For combination (K/2, K/2), the Node B applies large delay for both ranks 1 and 2.

In one design for 4×4 MIMO configuration, the set of delay combinations may include the following:

(0, 0, 0, 0), (0, 0, 0, K/4), (0, 0, K/3, 0) . . . (K/2, K/2, K/3, K/4), where combination (a, b, c, d) means that a delay of a is used for rank 1, a delay of b is used for rank 2, a delay of c is used for rank 3, and a delay of d is used for rank 4.

For combination (0, 0, 0, 0), the Node B applies no delay for all four ranks 1 through 4. For combination (0, 0, 0, K/4), the Node B applies no delay for ranks 1, 2 and 3 and large delay for rank 4. This combination achieves layer permutation when rank 4 is selected. For combination (0, 0, K/3, 0), the Node B applies no delay for ranks 1, 2 and 4 and large delay for rank 3. This combination achieves layer permutation when rank 3 is selected. The other combinations may be interpreted in similar manner.

In a second scheme, the UE may select a delay and send the selected delay to the Node B. The UE may evaluate different combinations of precoding matrix and delay and may select the combination of precoding matrix and delay that can provide the best performance. The UE may send the precoding matrix and the delay in this combination to the Node B for use for data transmission to the UE. The UE may also select a precoding and cyclic delay diversity structure, e.g., equation (1) for zero delay and small delay and equation (2) for large delay.

Figure 7:
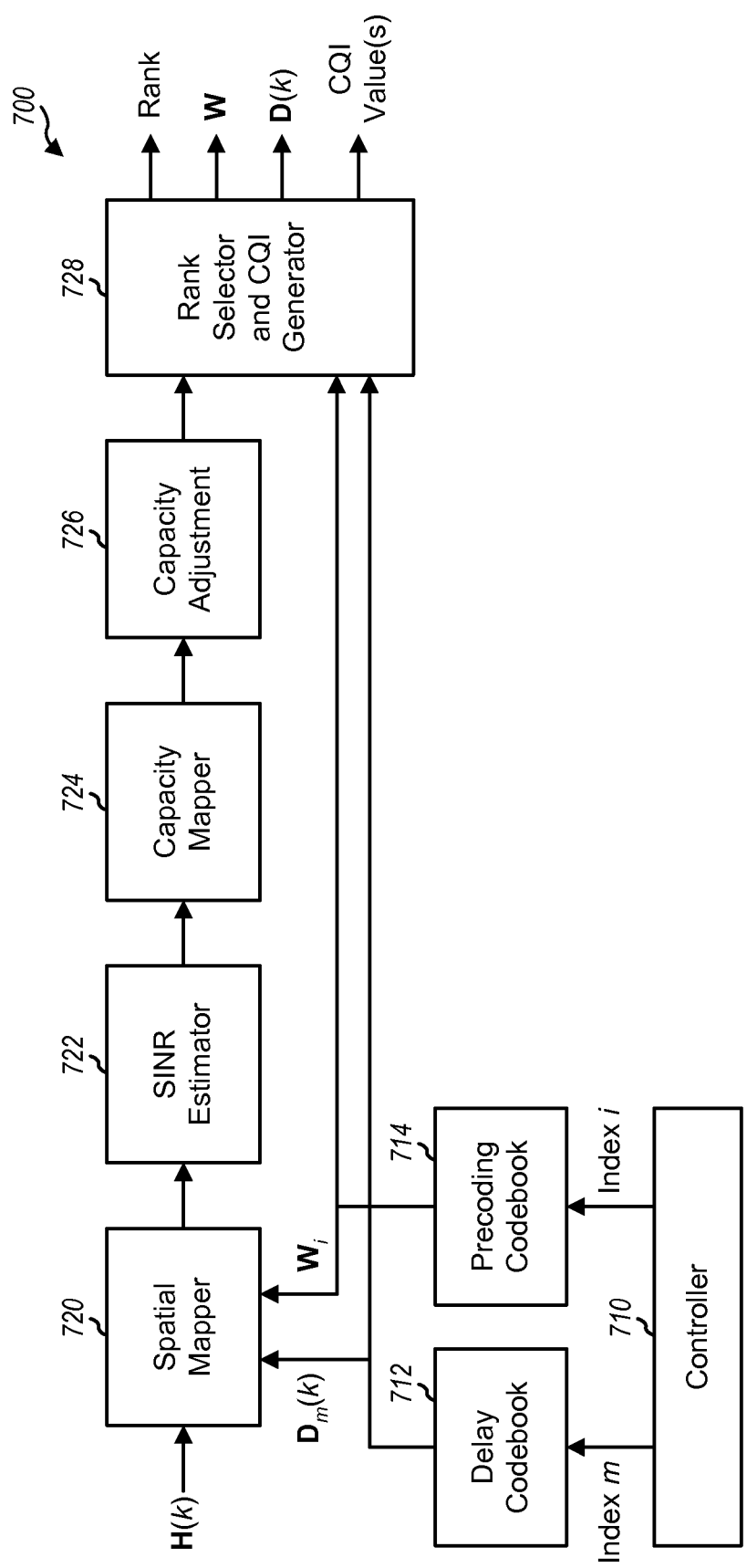
FIG. 7 shows a design of an evaluation unit to select a precoding matrix and a delay.

FIG. 7 shows a block diagram of a design of an evaluation unit 700 that selects a precoding matrix and a delay based on a sum-capacity metric. Unit 700 may be implemented by processor 290 at UE 120 or some other processor in FIG. 2. Within evaluation unit 700, a controller 710 may traverse through the set of precoding matrices and the set of delays and provide different combinations of precoding matrix and delay for evaluation. For example, controller 710 may traverse through the set of precoding matrices a first time for zero delay, then a second time for small delay, and then a third time for large delay. Controller 710 may provide a delay index m and a precoding matrix index i for the combination to evaluate. A delay codebook 712 may store the set of cyclic delay matrices, receive the delay index m, and provide the corresponding cyclic delay matrix $D_m(k)$. A precoder codebook 714 may store the set of precoding matrices, receive the precoding matrix index i, and provide the corresponding precoding matrix $W_i$.

A spatial mapper 720 may receive a MIMO channel estimate $H(k)$, the precoding matrix $W_i$, and the cyclic delay matrix $D_m(k)$ and may compute an effective MIMO channel estimate $H_{eff}(k)$, e.g., as shown in equation (3) or (4). $H_{eff}(k)$ includes T columns for T antennas for subcarrier k. Different hypotheses may be evaluated, with each hypothesis corresponding to a different combination of virtual antennas (i.e., a different column subset of $H_{eff}(k)$) that may be used for data transmission. For the case with T=4, a total of 15 hypotheses may be evaluated—four hypotheses for four individual virtual antennas, six hypotheses for six possible pairs of virtual antennas, four hypotheses for four possible sets of three virtual antennas, and one hypothesis for all four virtual antennas. Each hypothesis s is associated with a respective precoding submatrix $W_{i,s}$, which includes up to T specific columns of $W_i$.

An SINR estimator 722 may determine a set of SINRs for each hypothesis based on $H_{eff}(k)$ and the MIMO detection technique used by the UE. For rank 1, SINR estimator 722 may estimate the SINR of each virtual antenna based on a corresponding column of $H_{eff}(k)$, with all transmit power being allocated to one virtual antenna. For rank 2, SINR estimator 722 may estimate the SINRs of each possible pair of virtual antennas based on a corresponding pair of columns of $H_{eff}(k)$, with the transmit power being distributed (e.g., equally) to two virtual antennas. For rank 3, SINR estimator 722 may estimate the SINRs of each possible set of three virtual antennas based on a corresponding set of three columns of $H_{eff}(k)$, with the transmit power being distributed to three virtual antennas. For rank 4, SINR estimator 722 may estimate the SINRs of all four virtual antennas based on the four columns of $H_{eff}(k)$, with the transmit power being distributed to the four virtual antennas. For the case with T=4, SINR estimator 722 may provide 15 sets of SINRs for 15 hypotheses—four sets of one SINR for four different virtual antennas for rank 1, six sets of two SINRs for six different pairs of virtual antennas for rank 2, four sets of three SINRs for four possible sets of three virtual antennas for rank 3, and one set of four SINRs for all four virtual antennas for rank 4. The number of hypotheses may be different for rank-dependent precoding matrices.

A capacity mapper 724 may map each SINR to capacity based on an unconstrained capacity function or a constrained capacity function. Capacity mapper 724 may then accumulate the capacities of all K subcarriers for all virtual antennas for each hypothesis to obtain a sum capacity for that hypothesis. An adjustment unit 726 may adjust the sum capacity for each hypothesis based on a penalty factor for the rank of that hypothesis to obtain a total capacity for the hypothesis. A larger penalty factor may be used for higher rank to account for potentially larger implementation losses for higher rank.

A rank selector and CQI generator 728 may receive the total capacities for all hypotheses and select the hypothesis with the largest total capacity. Unit 728 may save pertinent information for the selected hypothesis.

The same processing may be repeated for each possible combination of precoding matrix and delay. Whenever the total capacity for the best hypothesis of a given combination is larger than the saved total capacity, unit 728 may save the larger total capacity and pertinent information. After all combinations of precoding matrix and delay have been evaluated, unit 728 may provide the precoding matrix $W_{i,s}$ and the delay for the best combination as the selected precoding matrix W and the selected delay. The precoding matrix W includes the L best columns of the precoding matrix $W_i$ in the best combination and conveys the rank L of the best hypothesis. The L columns of W are for L selected virtual antennas. Rank selection may also be performed in other manners. For example, the precoding matrix W may correspond to the best T×L rank-dependent precoding matrix available in the precoding codebook.

Unit 728 may also determine S SINRs of S data streams to send on the L selected virtual antennas, where S≥1. The SINR of each data stream may be determined based on the SINRs of the subcarriers and virtual antennas for that data stream. Unit 728 may then determine S channel quality indicator (CQI) values based on the SINRs of the S data streams. A CQI value may comprise an average SINR, a modulation and coding scheme (MCS), a packet format, a transport format, a rate, and/or some other information indicative of signal quality or transmission capacity. Unit 728 may provide S CQI values for the S data streams. Alternatively, unit 728 may provide a base CQI value and a differential CQI value. The base CQI value may represent the SINR of the data stream decoded first, and the differential CQI value may represent the difference between the SINRs of two data streams.

FIG. 7 shows a design in which the precoding matrix W and the delay are selected based on the sum-capacity metric. The precoding matrix and delay may also be selected based on other criteria such as feedback reliability (e.g., in consideration of latency, error, and possibly UE speed) and/or other factors.

In one design, the UE may send the precoding matrix W, the delay, and the CQI values to the Node B in each reporting interval. In another design, the UE may send the precoding matrix W and the CQI values in each reporting interval and may send the delay at a slower rate. The delay may be slowly varying in most channel environments. Sending the delay less frequently may reduce feedback overhead while marginally impacting performance.

The Node B may select the delay and send the selected delay to the UE. In this case, the UE may evaluate the set of precoding matrices in combination with only the selected delay. The Node B may also restrict the set of delays differently for each rank in order to reduce UE computational complexity as well as feedback overhead. For example, only zero delay may be allowed for rank 1, both zero delay and large delay may be allowed for rank 2, etc. The ULE may evaluate the set of precoding matrices in combination with each allowed delay for each rank.

The Node B may receive the precoding matrix W and the delay reported by the UE. The Node B may use the reported precoding matrix and delay for data transmission to the UE. Alternatively, the Node B may select a different precoding matrix and/or a different delay than the ones reported by the UE. The Node B may use the reported or selected precoding matrix and delay for data transmission to the UE. The Node B may also receive CQI values from the UE and may process data based on the received CQI values. The Node B may send data along with control information, which may indicate the selected precoding matrix, the selected delay, the MCS for each data stream, time-frequency resources used for data transmission, etc.

The precoding and cyclic delay diversity processing described herein may be performed for a data channel, a control channel, etc. The control channel may be used to send control information/signaling to different UEs, which may be at different locations. Large delay may be used for the control channel to maximize transmit diversity.

For the data channel, the designs shown in equations (1) and (2) and FIGS. 3A and 3B can support various MIMO modes such as closed-loop spatial multiplexing (for rank 2 or higher), beamforming (for rank 1), open-loop spatial multiplexing (for rank 2 or higher), open-loop transmit diversity (for rank 1), etc. The precoding and cyclic delay diversity processing may be performed in different manners for different modes. In one design, one or more of the following modes may be supported:

Open-loop mode with no precoding matrix information (PMI) available:
    1) High-mobility UE—use large delay and fixed precoding matrix.
Closed-loop mode with precoding matrix information available:
    1) Low-mobility UE with large amount of feedback—use small delay and reported preceding matrix,
    2) Low to high-mobility UE with reduced feedback—use large delay and reported preceding matrix.
Closed-loop mode with precoding matrix and delay information available:
    1) Use reported delay and reported preceding matrix.

The modes described above may be able to maximize transmit diversity and/or beamforming gain depending on the channel environments.

Since the large delay is greater than the cyclic prefix length, a pilot may be inserted after the precoding, e.g., either at the input of modulators 232 in FIGS. 3A and 3B or at the input of precoder 348 in FIG. 3B. This may ensure that the performance of channel estimation based on the pilot is not degraded by the cyclic delay diversity processing with the large delay. The UE may derive a MIMO channel estimate based on the pilot. If the pilot is inserted at the input of modulators 232, then the UE may apply the preceding matrix and the cyclic delay matrix to obtain an effective MIMO channel estimate. If the pilot is inserted at the input of precoder 348 in FIG. 3B, then the UE may apply the cyclic delay matrix to obtain an effective MIMO channel estimate. In any case, the UE may use the effective MIMO channel estimate for MIMO detection.

Figure 8:
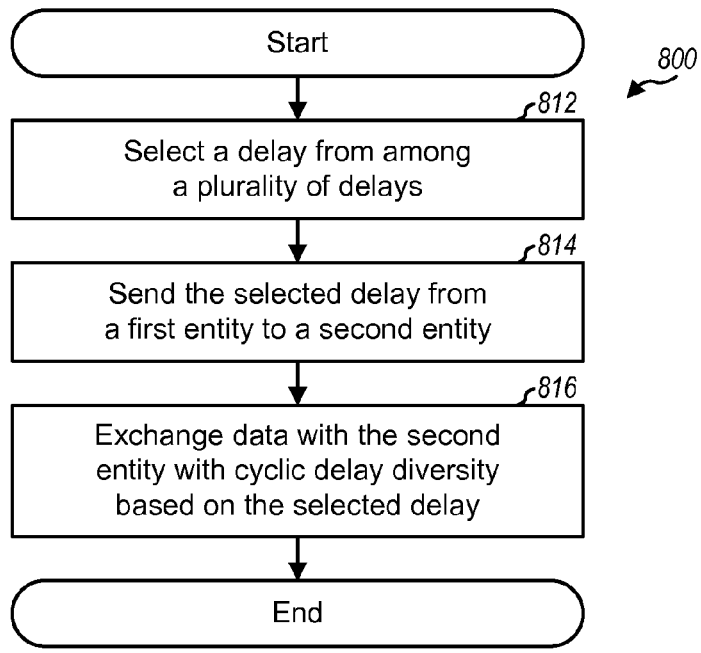
FIG. 8 shows a process for exchanging data.

FIG. 8 shows a design of a process 800 for exchanging data in a wireless communication system. Process 800 may be performed by a UE, a Node B, or some other entity. A delay may be selected from among a plurality of delays (block 812). The selected delay may be sent from a first entity to a second entity (block 814). Data may be exchanged with (e.g., sent to or received from) the second entity with cyclic delay diversity based on the selected delay (block 816).

The plurality of delays may include zero delay, a small delay of less than the cyclic prefix length, a large delay of greater than the cyclic prefix length, other delays, or a combination thereof. The large delay may correspond to a cyclic delay of K/L, where K is the number of samples for the useful portion of an OFDM symbol and L is the number of antennas to apply cyclic delay diversity. The delay may be selected based on data performance, rank, geometry, mobility, channel type, feedback reliability, etc. For example, zero delay may be selected for rank 1, for low geometry, for low mobility, for a data channel, etc. The large delay may be selected for rank 2, for high geometry, for high mobility, for a control channel, etc.

Figure 9:
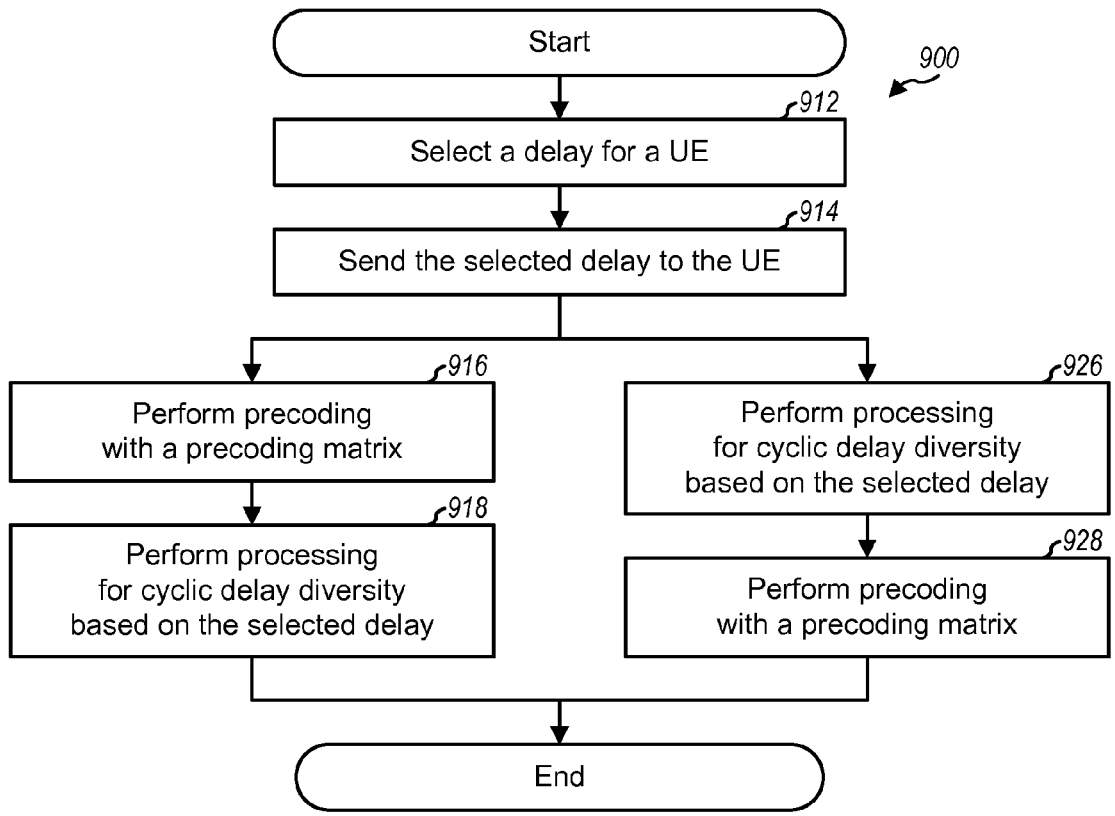
FIG. 9 shows a process performed by the Node B for data transmission.

FIG. 9 shows a design of a process 900 performed by a Node B. Process 900 is one design of process 800 in which the first entity is a Node B and the second entity is a UE. In one design of blocks 812 and 814 in FIG. 8, the Node B may select the delay specifically for the UE (block 912) and may send the selected delay to the UE (block 914). In another design of blocks 812 and 814, the Node B may select the delay for a set of UEs served by the Node B and may broadcast the selected delay to the set of UEs. In one design of block 816, which may be used for no delay or small delay, the Node B may perform precoding with a precoding matrix (block 916) and then perform processing for cyclic delay diversity based on the selected delay (block 918), e.g., as shown in equation (1) and FIG. 3A. In another design of block 816, which may be used for large delay, the Node B may perform processing for cyclic delay diversity based on the selected delay (block 926) and then perform precoding with the precoding matrix (block 928), e.g., as shown in equation (2) and FIG. 3B.

FIG. 10 shows a design of a process 1000 performed by a UE. Process 1000 is another design of process 800 in which the first entity is a UE and the second entity is a Node B. In one design of block 812 in FIG. 8, the UE may evaluate the plurality of delays based on at least one metric (block 1010) and may select the delay with the best at least one metric (block 1012). The UE may evaluate each delay based on a sum-capacity metric and may select the delay with the largest sum-capacity metric. In another design of block 812, the UE may evaluate a plurality of precoding matrices in combination with the plurality of delays based on at least one metric. The UE may determine the combination of precoding matrix and delay with the best at least one metric and may select the precoding matrix and delay in this combination. For both designs, the plurality of delays may comprise multiple delay sets for multiple ranks. Each delay set may comprise at least one delay usable for a respective rank and chosen from among all supported delays. The UE may evaluate only the at least one delay in the delay set for each rank.

The UE may send the selected delay to the Node B (block 1014). In one design of block 816 in FIG. 8, the UE may receive a data transmission sent by the Node B with cyclic delay diversity based on the selected delay (block 1016). The UE may derive an effective MIMO channel estimate based on the selected delay, the selected precoding matrix, etc. (block 1018). The UE may then perform MIMO detection for the received data transmission based on the effective MIMO channel estimate (block 1020).

For data transmission on the downlink, the Node B may perform process 900 in FIG. 9, and the UE may perform process 1000 in FIG. 10. For data transmission on the uplink, the UE may perform process 900 in FIG. 9, and the Node B may perform process 1000 in FIG. 10.

FIG. 11 shows a design of an apparatus 1100 for exchanging data in a wireless communication system. Apparatus 1100 includes means for selecting a delay from among a plurality of delays (module 1112), means for sending the selected delay from a first entity to a second entity (module 1114), and means for exchanging data with the second entity with cyclic delay diversity based on the selected delay (module 1116). The modules in FIG. 11 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to:
determine, from among a plurality of delays for cyclic delay diversity for a multiple-input multiple-output (MIMO) transmission, a subset of delays, each of the subset of delays comprising a delay for each of a plurality of ranks, each of the plurality of ranks corresponding to a different number of virtual antennas,
send, by a node of a wireless network, information associated with the determined subset of delays to a user equipment (UE),
receive, from the UE, a report based on an evaluation of the subset of delays over the plurality of ranks,
select, at the node, a rank from among the plurality of ranks and a delay from among the plurality of delays for cyclic delay diversity for the MIMO transmission based at least in part on the report, and
exchange data with the UE based on the selected rank and with cyclic delay diversity based on the selected delay; and
a memory coupled to the at least one processor.

2. The apparatus of claim 1, wherein the at least one processor is configured to evaluate a plurality of precoding matrices in combination with the plurality of delays based on at least one metric, to determine a combination of a precoding matrix and a delay with a best value for the at least one metric, and to select the precoding matrix and the delay in the combination with the best value for the at least one metric.

3. The apparatus of claim 1, wherein the at least one processor is configured to derive an effective MIMO channel estimate based on a cyclic delay matrix for the selected delay, and to perform MIMO detection for a received data transmission based on the effective MIMO channel estimate.

4. The apparatus of claim 1, wherein the at least one processor is configured to perform processing for cyclic delay diversity based on the selected delay, and to perform precoding with a precoding matrix after the processing for cyclic delay diversity.

5. The apparatus of claim 1, wherein the at least one processor is configured to perform precoding with a precoding matrix and to perform processing for cyclic delay diversity based on the selected delay after the precoding.

6. The apparatus of claim 1, wherein the plurality of delays comprise zero delay and a large delay of greater than a cyclic prefix length.

7. The apparatus of claim 6, wherein the large delay corresponds to a cyclic delay of K/L, where K is number of samples in a useful portion of an orthogonal frequency division multiplexing (OFDM) symbol and L is number of antennas to apply cyclic delay diversity.

8. The apparatus of claim 6, wherein the plurality of delays further comprise a small delay of less than the cyclic prefix length.

9. The apparatus of claim 8, wherein the at least one processor is configured to select the zero delay or the small delay for rank 1 and to select the large delay for rank 2.

10. The apparatus of claim 8, wherein the at least one processor is configured to select the zero delay or the small delay for low geometry and to select the large delay for high geometry.

11. The apparatus of claim 8, wherein the at least one processor is configured to select the zero delay or the small delay for a data channel and to select the large delay for a control channel.

12. The apparatus of claim 1, wherein the at least one processor is configured to select the delay based on data performance, or rank, or geometry, or mobility, or channel type, or feedback reliability, or a combination thereof.

13. The apparatus of claim 1, wherein the plurality of delays comprise at least one delay for each of the plurality of ranks, and wherein the at least one processor is configured to select the delay based on the selected rank.

14. A method for wireless communication, comprising:
determining, from among a plurality of delays for cyclic delay diversity for a multiple-input multiple-output (MIMO) transmission, a subset of delays, each of the subset of delays comprising a delay for each of a plurality of ranks, each of the plurality of ranks corresponding to a different number of virtual antennas;
sending, by a node of a wireless network, information associated with the determined subset of delays to a user equipment (UE);
receiving, from the UE, a report based on an evaluation of the subset of delays over the plurality of ranks;
selecting, at the node, a rank from among the plurality of ranks and a delay from among the plurality of delays for cyclic delay diversity for the MIMO transmission based at least in part on the report; and
exchanging data with the UE based on the selected rank and with cyclic delay diversity based on the selected delay.

15. The method of claim 14, wherein the selecting the delay comprises evaluating a mobility state of the UE, and evaluating a channel environment of the UE.

16. The method of claim 14, wherein the selecting the delay comprises
evaluating a plurality of precoding matrices in combination with the plurality of delays based on at least one metric,
determining a combination of a precoding matrix and a delay with a best value for the at least one metric, and
selecting the precoding matrix and the delay in the combination with the best value for the at least one metric.

17. The method of claim 14, wherein the exchanging data with the UE comprises
receiving a data transmission sent by the UE with cyclic delay diversity based on the selected delay,
deriving an effective MIMO channel estimate based on a cyclic delay matrix for the selected delay, and
performing MIMO detection for the received data transmission based on the effective MIMO channel estimate.

18. The method of claim 14, wherein the exchanging data with the UE comprises
performing processing for cyclic delay diversity based on the selected delay, and
performing precoding with a precoding matrix after the processing for cyclic delay diversity.

19. The method of claim 14, wherein the exchanging data with the UE comprises
performing precoding with a precoding matrix, and
performing processing for cyclic delay diversity based on the selected delay after the precoding.

20. The method of claim 14, wherein the report comprises a first delay, and wherein the selecting the delay for cyclic delay diversity for the MIMO transmission comprises selecting a second, different delay.

21. An apparatus for wireless communication, comprising:
means for determining, from among a plurality of delays for cyclic delay diversity for a multiple-input multiple-output (MIMO) transmission, a subset of delays, each of the subset of delays comprising a delay for each of a plurality of ranks, each of the plurality of ranks corresponding to a different number of virtual antennas;
means for sending, by a node of a wireless network, information associated with the determined subset of delays to a user equipment (UE);
means for receiving, from the UE, a report based on an evaluation of the subset of delays over the plurality of ranks;
means for selecting, at the node, a rank from among the plurality of ranks and a delay from among the plurality of delays for cyclic delay diversity for the MIMO transmission based at least in part on the report; and
means for exchanging data with the UE based on the selected rank and with cyclic delay diversity based on the selected delay.

22. The apparatus of claim 21, wherein the means for selecting the delay comprises
means for evaluating a mobility state of the UE, and
means for evaluating a channel environment of the UE.

23. The apparatus of claim 21, wherein the means for selecting the delay comprises
means for evaluating a plurality of precoding matrices in combination with the plurality of delays based on at least one metric,
means for determining a combination of a precoding matrix and a delay with a best value for the at least one metric, and means for selecting the precoding matrix and the delay in the combination with the best value for the at least one metric.

24. The apparatus of claim 21, wherein the means for exchanging data with the UE comprises
means for receiving a data transmission sent by the UE with cyclic delay diversity based on the selected delay,
means for deriving an effective MIMO channel estimate based on a cyclic delay matrix for the selected delay, and
means for performing MIMO detection for the received data transmission based on the effective MIMO channel estimate.

25. The apparatus of claim 21, wherein the means for exchanging data with the UE comprises
means for performing processing for cyclic delay diversity based on the selected delay, and
means for performing precoding with a precoding matrix after the processing for cyclic delay diversity.

26. The apparatus of claim 21, wherein the means for exchanging data with the UE comprises
means for performing precoding with a precoding matrix, and
means for performing processing for cyclic delay diversity based on the selected delay after the precoding.

27. A non-transitory machine-readable medium comprising instructions which, when executed by a machine, cause the machine to perform operations including:
determining, from among a plurality of delays for cyclic delay diversity for a multiple-input multiple-output (MIMO) transmission, a subset of delays, each of the subset of delays comprising a delay for each of a plurality of ranks, each of the plurality of ranks corresponding to a different number of virtual antennas;
sending, by a node of a wireless network, information associated with the determined subset of delays to a user equipment (UE);
receiving, from the UE, a report based on an evaluation of the subset of delays over the plurality of ranks;
selecting, at the node, a rank from among the plurality of ranks and a delay from among the plurality of delays for cyclic delay diversity for the MIMO transmission based at least in part on the report; and
exchanging data with the UE based on the selected rank and with cyclic delay diversity based on the selected delay.

* * * * *